UNITED STATES PATENT OFFICE.

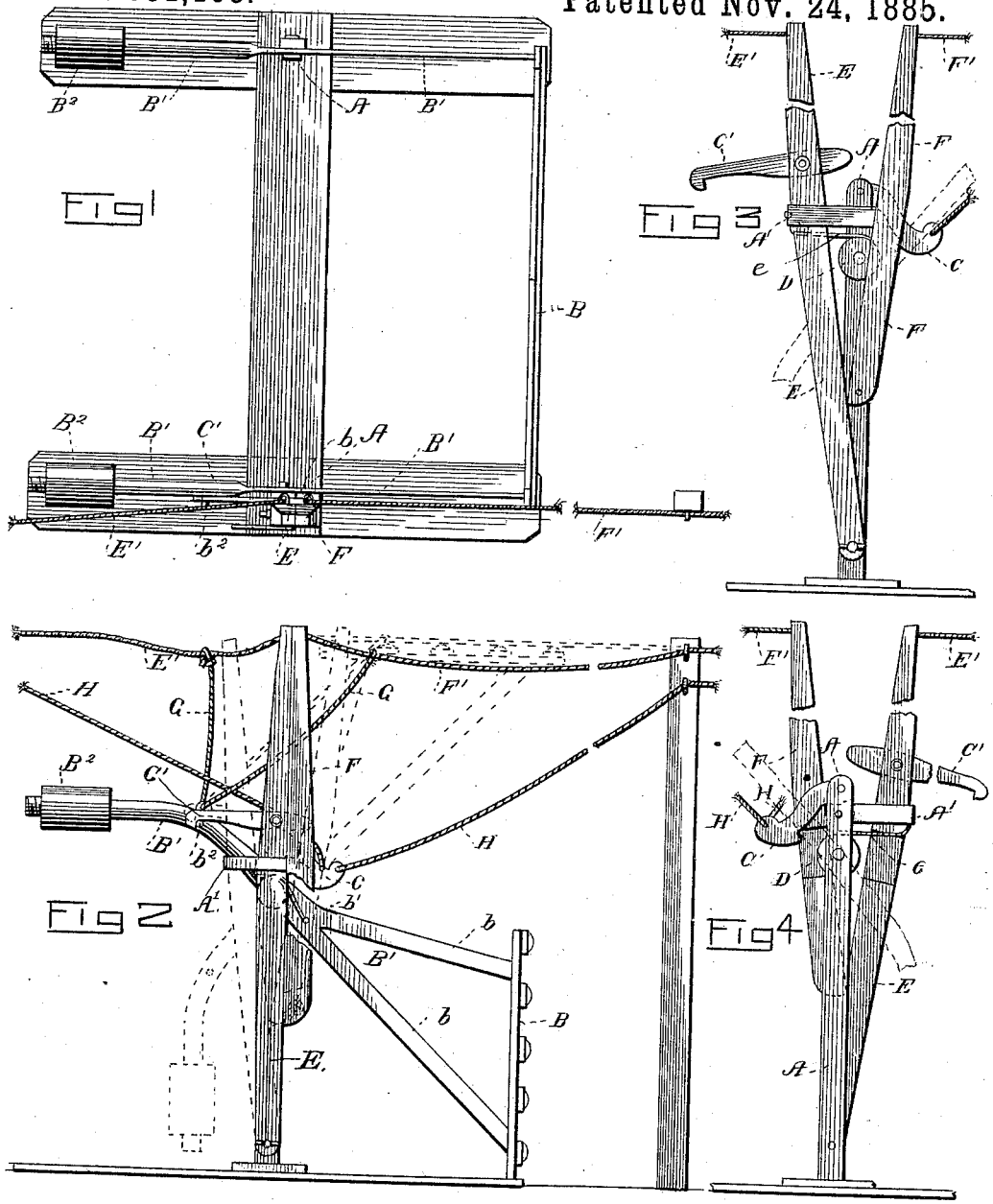

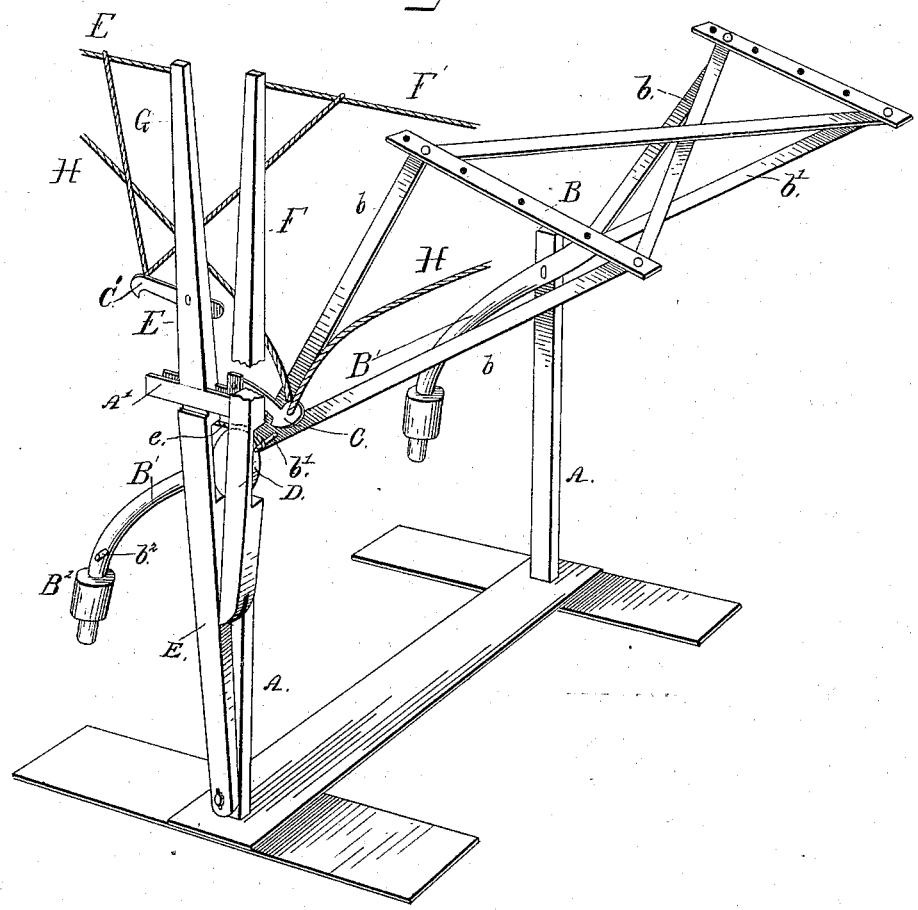

HIRAM TERRY, OF BONHAM, TEXAS.

GATE.

SPECIFICATION forming part of Letters Patent No. 331,168, dated November 24, 1885.

Application filed November 20, 1884. Serial No. 148,436. (No model.)

*To all whom it may concern:*

Be it known that I, HIRAM TERRY, a citizen of the United States, residing at Bonham, in the county of Fannin and State of Texas, have invented certain new and useful Improvements in Gates; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of gates for farm or other use which are designed to be automatically operated from either approach.

It consists in certain novel constructions, combinations, and arrangements of parts, as will be hereinafter more fully described and claimed.

In the drawings, Figure 1 is a plan view of my gate closed, arranged as in use. Fig. 2 is a side view of the gate with motions indicated. Fig. 3 is a detail enlarged view of one side of the mechanism by which the gate is operated. Fig. 4 is a similar view taken from the opposite side from that shown in Fig. 3. Fig. 5 shows the gate in perspective partially opened.

Suitable supports or standards, A, are arranged in rear of and laterally to the gate-opening, and one on each side of the roadway. The gate B is fitted properly to the gateway, and may be of any desired construction. Arms B' B' are attached at one end to the gate B, and projected rearwardly therefrom. These arms are pivoted preferably at about their middle points to the standards A, near the upper ends of the same. It will be noticed that the gate is arranged at an angle approximating a right angle to the arms. The objects of this arrangement are, that by it the weight of the gate suffices to hold it firmly in position when closed, and that when raised the gate will be turned into a horizontal position, thus presenting only its edge to the wind, by which arrangement only a small wind-surface is presented, and the danger of damage to the gate by the force of the wind is overcome. This will be seen to be an important consideration when the gate is arranged in an exposed position. By preference the arms B' are extended beyond their pivots and provided on their extremities with weights $B^2$, forming counterpoises. By this arrangement the operation of the gate is made easier, except for which purpose they might be dispensed with.

The forward ends of the arms B' are preferably branched, providing branches $b$ $b$—one made fast to the lower and the other to the upper part of the gate, so as to more firmly brace the same. One of the arms B' is provided, respectively in advance and in rear of its pivot, with lateral studs or pins $b'$ $b^2$. A latch, C, is pivoted on the adjacent support in position to engage the pin $b'$ when the gate is elevated or opened and hold it in such position. On one of the standards, near its upper end, I journal a guide-pulley, D. The main operating-lever E is pivoted near its lower end to the same standard, and extends thence up in rear of and above the guide-pulley D. A cord, $e$, is secured to the main lever, and extends thence over pulley D, and is attached to the adjacent arm of the gate, usually to the stud or pin $b'$, and as the upper end of lever E is moved to the rear the gate will be elevated by the construction before described. I prefer in practice to retain the main lever from lateral displacement by means of the guide-plates A' A', projected rearwardly from the standard on opposite sides of the lever. On the lever E, I pivot a latch, C', suited to engage the pin $b^2$ when the gate is closed, and thus secure the gate in such position. It is obvious that instead of supporting this latch on the lever E it might, like latch C, be supported on the standard. The supplemental lever F is pivoted to the standard in front of the main lever and impinges at its lower end against said lever, so that when the upper end of lever F is moved forward its lower end will actuate lever E and raise the gate.

In practice I design to have a cord, F', run forward from lever F in reach from in front of the gate, and a cord, E', carried rearwardly from lever E, so that a rider approaching the gate from either direction can open the gate without dismounting from the horse or vehicle.

It will be understood that by extending a rod from the lever E to the front of the gate the lever E might be actuated by pushing on said rod, and the lever F be dispensed with; but I prefer to use said lever, as before described.

Short cords G G connect the latch C' with the cords E' F', and are fastened to the latter, near their connection with their respective levers, in such manner that when cords E' F' are tightened they will first release latch C' and then actuate the levers E or F. Cords H H are carried to the front and rear from latch C, so that the said latch may be released and the gate closed after the driver has gone through.

It is manifest that the operating device, including the levers E F, latches, cords, &c., may be duplicated on the opposite side of the gate, so that the latter may be operated from either side of the road, as may be desirable.

It will be understood that the gate may be used without the automatic operating mechanism and raised by hand; but I prefer to use the said mechanism because of the greater ease with which the gate may be operated thereby, and because thereby I avoid dismounting to open and close the gate.

Having thus described my invention, what I claim, and desire to secure by Letters Patent, is—

1. The combination of the gate, vertically-arranged arms projected rearwardly and upwardly therefrom and counterbalanced on their outer ends, supports pivotally connected to said arms midway of their ends, and an interlocking latch to engage and retain the gate in an elevated position, substantially as described.

2. The combination of the supports or standards, the gate provided with rearwardly-extended arms pivoted to said standards, the pulley journaled to one of the standards, and the main operating-lever pivoted to the support, a cord secured at one end to one arm of the gate and at its other end to the main lever, and carried over the said pulley, and means whereby the said lever may be actuated from either side of the gate, substantially as set forth.

3. The combination of vertical supports, a gate vertically arranged and set at a distance in advance of the supports, arms rearwardly extended from the gate and pivotally attached to the supports midway of their ends, counter-balances on the free ends of the arms, a stud projecting laterally from one arm, and a latch pivoted to the support and adapted to engage said stud, whereby the gate is held in a closed position, substantially as described.

4. The combination, with the standards or supports, of the gate and its rearwardly-extending counterbalance-arms pivoted to the supports, and latches on the supports adapted to engage one of the gate-arms and secure the gate in either its open or closed position, substantially as set forth.

5. The combination of the supports, the gate having its arms pivoted thereto, the main lever pivoted to one of the supports and connected with one of the gate-arms, and the supplemental lever arranged to engage the main lever, substantially as set forth.

6. The combination, with the supports, the gate having its arms pivoted to the supports, the latch C', adapted to engage one of the arms and retain the gate in its closed position, the latch C, adapted to engage one of the arms and hold the gate open, the main lever E, pivoted at its lower end and connected with one arm of the gate, and the supplemental lever F, all substantially as and for the purposes specified.

7. The combination of the standards or supports arranged laterally to and in rear of the gateway, the gate fitted to said gateway and provided with rearwardly-extended arms pivoted to the supports, and the levers and ropes whereby the gate may be operated, substantially as and for the purposes set forth.

In testimony whereof I affix my signature in presence of two witnesses.

HIRAM TERRY.

Witnesses:
R. INGLISH,
J. H. OLIPHINT.